US011216189B2

(12) United States Patent
Li et al.

(10) Patent No.: US 11,216,189 B2
(45) Date of Patent: Jan. 4, 2022

(54) METHOD AND COMPUTER PROGRAM PRODUCT FOR READING PARTIAL DATA OF A PAGE ON MULTIPLE PLANES

(71) Applicant: Silicon Motion, Inc., Zhubei (TW)

(72) Inventors: Kuan-Te Li, Taipei (TW); Jian-Wei Sun, Taipei (TW); Ting-Heng Chou, Taipei (TW)

(73) Assignee: SILICON MOTION, INC., Hsinchu County (TW)

( * ) Notice: Subject to any disclaimer, the term of this patent is extended or adjusted under 35 U.S.C. 154(b) by 158 days.

(21) Appl. No.: 16/730,159

(22) Filed: Dec. 30, 2019

(65) Prior Publication Data

US 2020/0310643 A1    Oct. 1, 2020

Related U.S. Application Data

(60) Provisional application No. 62/827,317, filed on Apr. 1, 2019.

(30) Foreign Application Priority Data

Nov. 6, 2019 (CN) .......................... 201911076916.4

(51) Int. Cl.
*G06F 12/00* (2006.01)
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ...... G06F 3/061; G06F 3/0679; G06F 3/0659; G06F 2212/7208; G06F 2212/7203; G06F 2212/1016; G06F 3/0661; G06F 12/0246
(Continued)

(56) References Cited

U.S. PATENT DOCUMENTS 8,924,675 B1  12/2014 Burke et al.
9,383,942 B2   7/2016 Ezra et al.
(Continued)

FOREIGN PATENT DOCUMENTS

TW       I506549 B    11/2015

OTHER PUBLICATIONS

English Translation of Taiwanese Search Report for Taiwanese Application No. 108140180, dated Dec. 22, 2020.

*Primary Examiner* — Mardochee Chery
(74) *Attorney, Agent, or Firm* — Birch, Stewart, Kolasch & Birch, LLP

(57) ABSTRACT

A non-transitory computer-readable storage medium, a method, and an apparatus for reading partial data of a page on multiple data planes are provided. A processor core when loading and executing program code is arranged operably to: select at least two flash-memory access commands, which individually reads data whose length (e.g., 4KB or 8KB) is shorter than a length (e.g., 16KB) of one page across data planes for a logical unit number (LUN) according to the content of scheduling table; integrate the selected flash-memory access commands into one MPR-Lite command; drive a flash interface to perform a multi-page read lite (MPR-Lite) operation by executing the MPR-Lite command rather than the flash-memory access commands to read data from the LUN; and reply with read data to a host. Therefore, the time delay between the execution of selected flash-memory access commands would be reduced.

20 Claims, 14 Drawing Sheets

(58) Field of Classification Search
USPC .......................................................... 711/103
See application file for complete search history.

(56) References Cited

U.S. PATENT DOCUMENTS

| | | |
|---|---|---|
| 2004/0010612 A1 | 1/2004 | Pandya |
| 2013/0246732 A1* | 9/2013 | Seng ................... G06F 12/0246 711/203 |
| 2014/0149665 A1 | 5/2014 | Ezra et al. |
| 2014/0195772 A1 | 7/2014 | McCormick, Jr. |

* cited by examiner

METHOD AND COMPUTER PROGRAM PRODUCT FOR READING PARTIAL DATA OF A PAGE ON MULTIPLE PLANES

CROSS-REFERENCE TO RELATED APPLICATIONS

This application claims the benefit of priority to U.S. Provisional Application Ser. No. 62/827,317, filed on Apr. 1, 2019; and Patent Application No. 201911076916.4, filed in China on Nov. 6, 2019: the entirety of which is incorporated herein by reference for all purposes.

BACKGROUND

The disclosure generally relates to storage devices and, more particularly, to methods, computer program products and apparatuses for reading partial data of a page on multiple planes.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

The read command provided by the conventional NAND flash memory can enable the controller to read data of the whole page across multiple planes. However, since the length (for example, 16 KB) of one page across planes is longer than a data length (for example, 4 KB) of a Logical Block Address (LBA) managed by the Operating System (OS) run on a host, the overall performance of the NAND flash memory may be degraded that the controller conventionally requires to perform a data read operation to read the whole page across planes to respond to a short-data read instruction issued by the host. Thus, it is desirable to have methods, computer program products and apparatuses for reading partial data of a page across multiple planes, so as to optimize data read operations with the NAND flash memory having a longer length of one page across multiple planes.

SUMMARY

In an aspect of the invention, a non-transitory computer program product for reading partial data of a page on multiple planes when executed by a processor core is introduced to include program code to: provide a scheduling table; put each flash-memory access command of a command queue into a cell of the scheduling table according to physical address information of the flash-memory access command; select two flash-memory access commands or more for a logical unit number (LUN) according to the content of the scheduling table; drive a flash interface to perform a multi-page read lite (MPR-Lite) operation for reading data requested by the selected flash-memory access commands from the LUN; and reply with the read data to a host.

In another aspect of the invention, a method for reading partial data of a page on multiple planes, performed by a processor core, is introduced to include: providing a scheduling table; putting each flash-memory access command of a command queue into a cell of the scheduling table according to physical address information of the flash-memory access command; selecting two flash-memory access commands or more for a LUN according to the content of the scheduling table; driving a flash interface to perform a MPR-Lite operation for reading data requested by the selected flash-memory access commands from the LUN; and replying with the read data to a host.

In still another aspect of the invention, an apparatus for reading partial data of a page on multiple planes is introduced to include: a memory and a processor core. The memory is arranged to operably store a scheduling table. The processor core is arranged to operably put each flash-memory access command of a command queue into a cell of the scheduling table according to physical address information of the flash-memory access command; select two flash-memory access commands or more for a LUN according to the content of the scheduling table; and drive a flash interface to perform a MPR-Lite operation for reading data requested by the selected flash-memory access commands from the LUN, so as to reply with the read data to a host.

Each of the selected flash-memory access commands requests for reading data whose length is shorter than a length of one page across planes.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second". "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
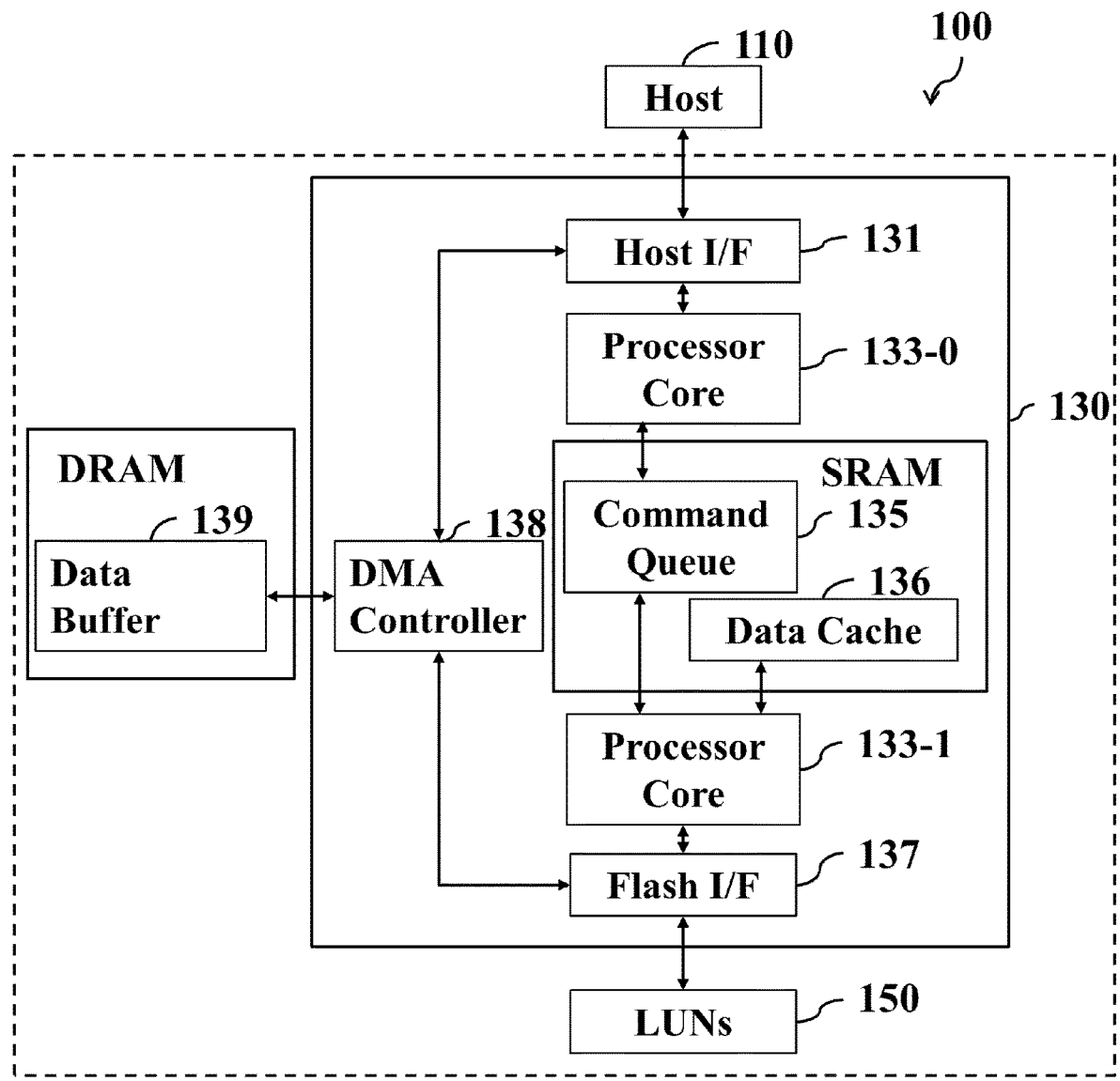
FIG. 1 is the system architecture of a flash-storage system according to an embodiment of the invention.

Refer to FIG. 1. The electronic apparatus 100 includes a central processing unit (CPU) 110, a Random Access Memory (RAM) 120 and a storage device 130. The CPU 110 may create queues on demand for its operations. The flash-storage system architecture 100 includes a host 110, a controller (also referred to as a device) and logical block numbers (LUNs) 150. The system architecture may be practiced in a Personal Computer (PC), a laptop PC, a tablet PC, a mobile phone, a digital camera, a digital recorder, or other consumer electronic products. The controller 130 may contain a multi-core processor 133 being a single computing component with two independent processor cores 133-0 and 133-1, which load and execute program codes of a firmware or software module. The processor core 133-0 may communicate with the host 110 by using a communications protocol, such as Universal Flash Storage (UFS), Non-Volatile Memory Express (NVMe), Universal Serial Bus (USB), Advanced Technology Attachment (ATA), Serial Advanced Technology Attachment (SATA), Peripheral Component Interconnect Express (PCI-E), etc., or any extension. The processor core 133-1 may communicate with the LUNs 150 by using a Double Data Rate (DDR) protocol, such as Open NAND Flash Interface (ONFI), DDR Toggle, etc., or any extension.

Figure 2:
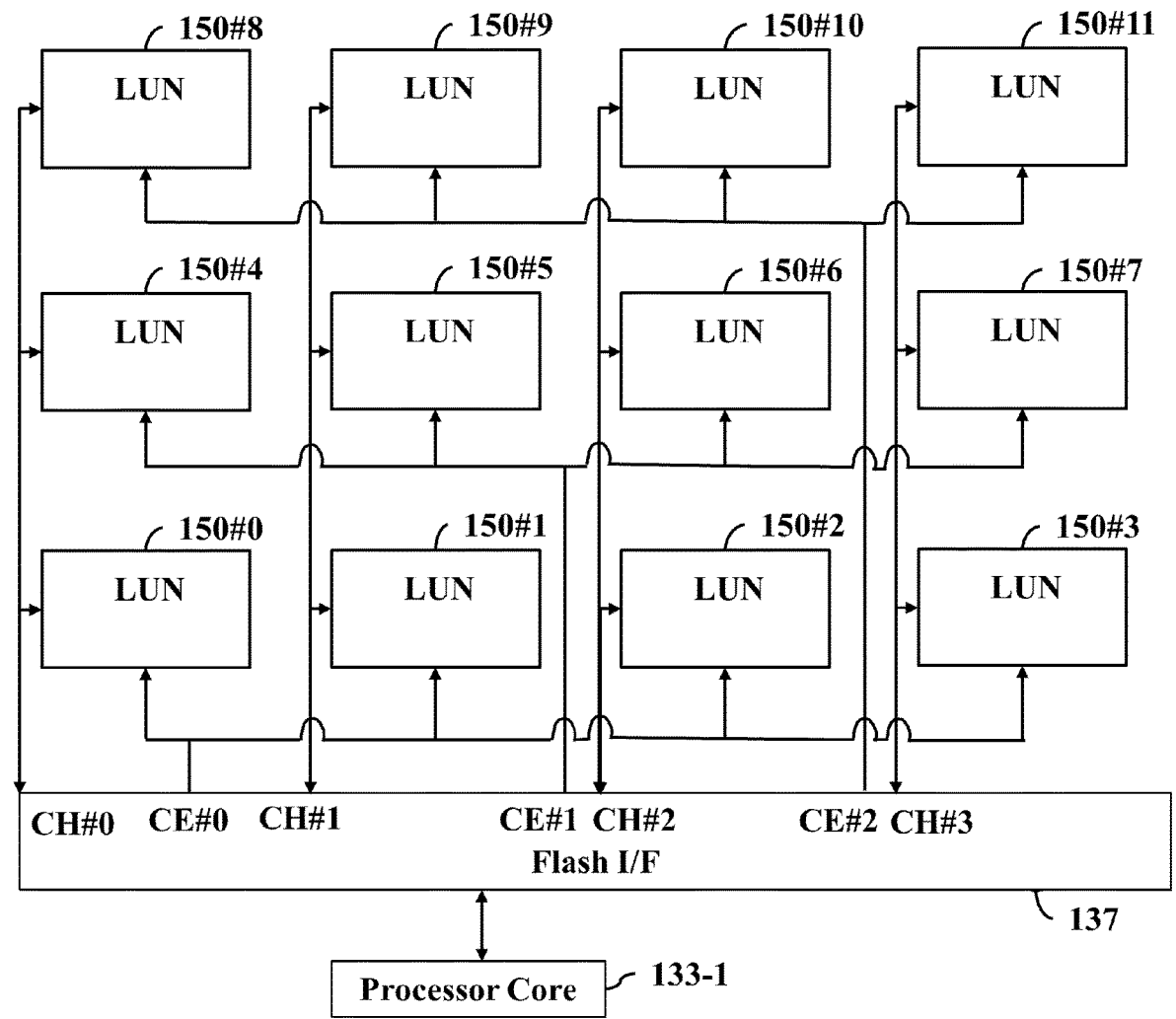
FIG. 2 is a schematic diagram illustrating Logical Unit Numbers (LUNs) connecting to a flash interface.
Figure 3:
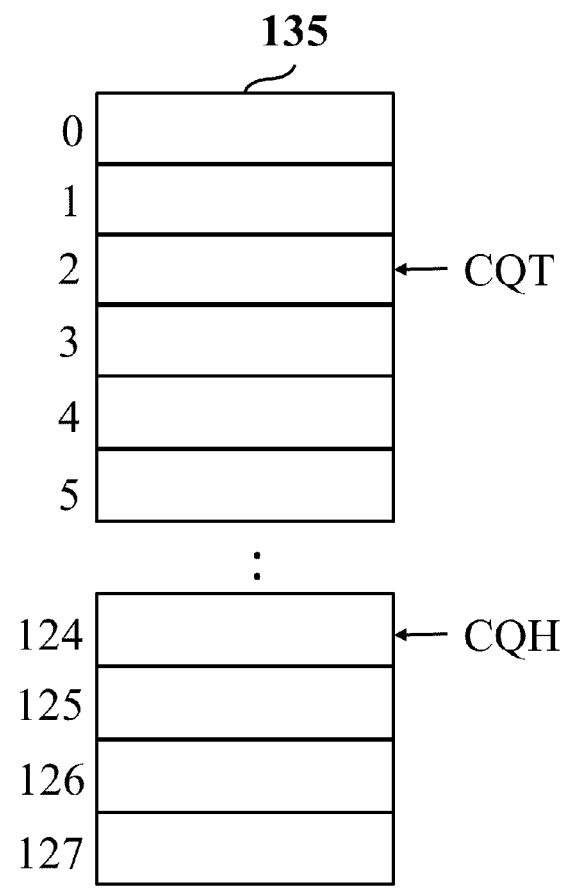
FIG. 3 is a schematic diagram illustrating a command queue.

The LUNs 150 provides huge storage space typically in hundred Gigabytes, or even several Terabytes, for storing a wide range of user data, such as high-resolution images, video files, etc. Each LUN 150 includes control circuits and a memory array containing memory cells, such as Triple Level Cells (TLCs) or Quad-Level Cells (QLCs). A data buffer 139 is used to buffer user data that is read from the LUNs 150 and will be output to the host 110. Refer to FIG. 2. The flash interface (I/F) 137 may include four I/O channels (hereinafter referred to as channels CH) CH#0 to CH#3 individually connected to three LUNs, for example, the channel CH#0 is connected to the LUNs 150#0, 150#4 and 150#8. The processor core 133-1 may drive the flash I/F 137 to issue one of the Chip Enable (CE) signals CE#0 to CE#2 to enable corresponding ones of LUNs 150#0 to 150#3, 150#4 to 150#7, or 150#8 to 150#11. After that, user data is read from or programmed into the enabled LUNs in parallel. Although, for the brevity, the following passages merely take the channels CH#0 to CH#1 and the LUNs 150#0~1 and LUNs 150#4~5 activated by CE#0 and CE#1, respectively as exemplary subjects, the invention should not be limited thereto.

The controller 130 may be equipped with a command queue 135 for storing flash-memory access commands, such as read page commands, program page commands, erase block commands, etc. The flash-memory access commands may be associated with host commands, such as host read commands, host write commands, etc., that have been issued by the host 110 but have not been processed by the controller 130 completely. Moreover, the flash-memory access commands may be actively generated by the controller 130 rather than the host 110 for certain purposes.

The command queue 135 may be practiced in a Static Random Access Memory (SRAM) containing a collection of entries. Each entry of the command queue may store one flash-memory access command with relevant information. The entries of the collection are kept in the time order. The principle operations performed by the processor core 133-0 on the collection are the addition of entities to the rear terminal position (for example, the position pointed by the pointer CQT), known as enqueue, and removal of entities from the front terminal position (for example, the position pointed by the pointer CQH), known as dequeue. However, to optimize data read operations, the first flash-memory access command added to the command queue 135 is not necessarily the first one to be removed. Moreover, the controller 130 may use a stack to store the aforementioned flash-memory operation commands instead, the invention should not be limited thereto.

Figure 4:
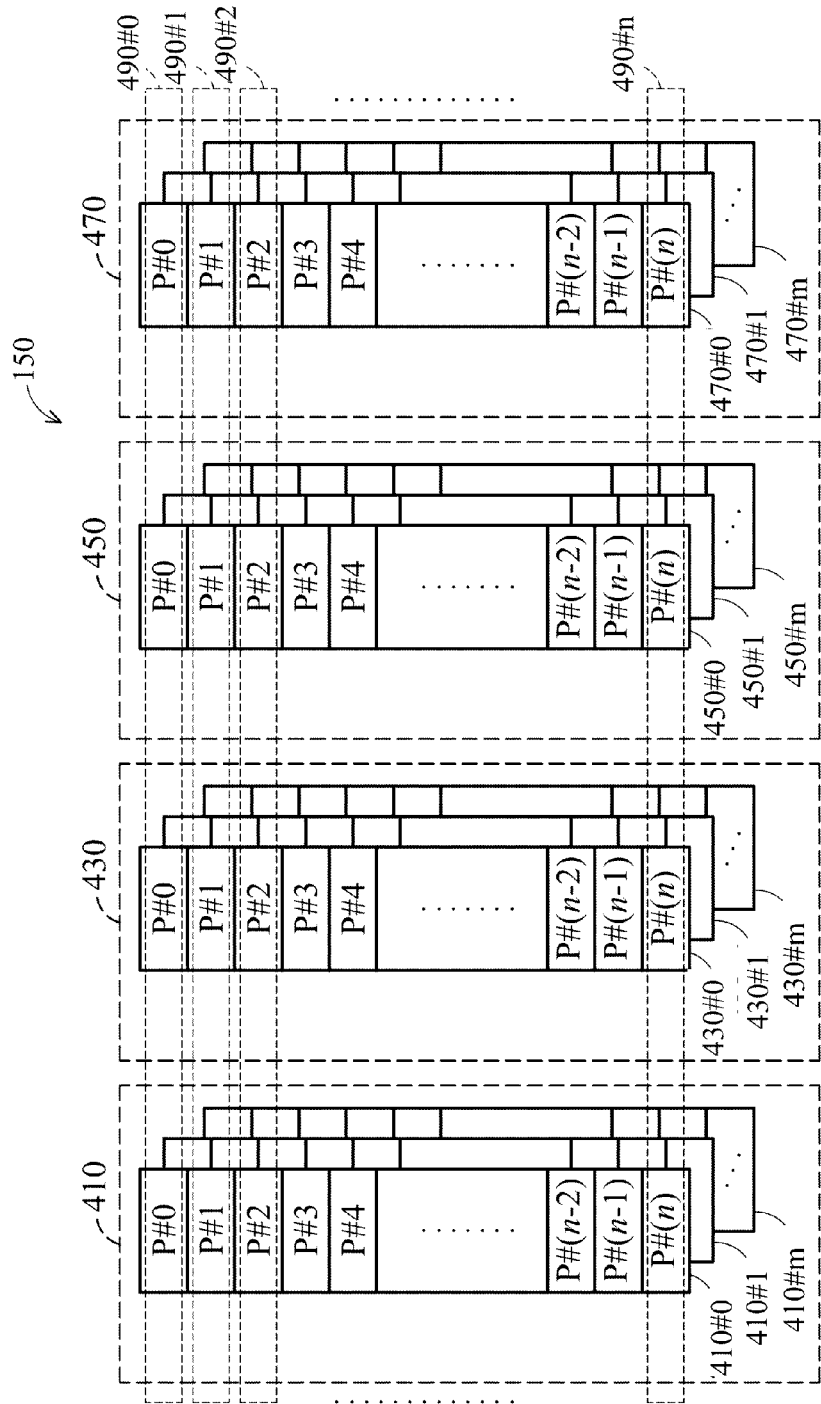
FIG. 4 is a schematic diagram showing the data organization of a LUN.

The LUNs include multiple planes. Refer to FIG. 4. The LUN 150#0 being taken as an example includes: planes 410 to 470. Each plane includes physical blocks (hereinafter referred to as blocks for brevity). The plane 410 being taken as an example includes pages P#0 to P#n, n is a positive integer. Each page includes multiple NAND memory cells and the NAND memory cells may be Triple-Level Cells (TLCs) or Quad-Level Cells (QLCs). In some embodiments, when each NAND memory cell is TLC capable of recording eight states, one physical wordline may include pages P#0 (referred to as Most Significant Bit, MSB pages), pages P#1 (referred to as Center Significant Bit, CSB pages) and pages P#2 (referred to as Least Significant Bit, LSB pages). When each NAND memory cell is QLC capable of recording sixteen states, in addition to MSB, CSB and LSB pages, one physical wordline may further include Top Significant Bit (TSB) pages. Blocks across different planes of the same LUN 150 may virtually form a big block and big blocks across different LUNs 150 may virtually form a super block.

A data cache 136 and/or the data buffer 139 may store a logical-physical mapping (L2P) table required in data reads for fast lookup and recording mapping information between a logical address and a physical address for each data entry. The data cache 136 and the data buffer 139 may be practiced in predefined regions of the SRAM and a dynamic random access memory (DRAM), respectively.

Although memory cells of each block or page are TLCs or QLCs, the controller 130 may employ the Single-Level Cell (SLC) mode to program data into blocks or pages to speed up the data programming and future data reads. To facilitate the programming-mode management for blocks, the controller 130 preferably creates and maintains a physical configuration table for recording a programming mode for each block or page, such as the default mode (the TLC or QLC mode) or the SLC mode, and stores the physical configuration table in the data cache 136. In a data read operation, the controller 130 may search the physical configuration table to recognize the programming mode for each block or page, and then read data from that in a proper manner.

Figure 5:
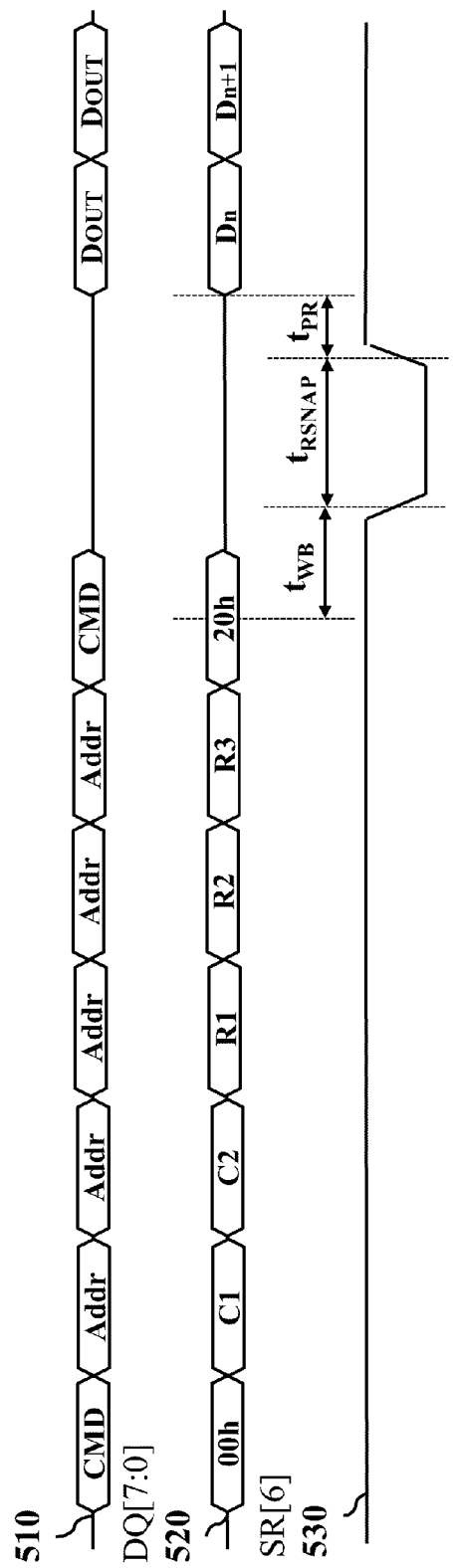
FIG. 5 is a timing diagram illustrating a snap read operated on a flash interface.

The controller 130 may output a read page command for reading data of one page of one block of one plane and as well a read page multi-plane command for reading data of one page across different planes. However, sometimes the host 110 does not need whole-page data but 4 KB-data of one page. So, the controller 130 may use a snap read command to read partial data of one page. Refer to FIG. 5 illustrating a snap read operation. A waveform 510 shows cycle types for data lines DQ[7:0] coupled between the LUNs 150 and the flash I/F 137 in sequence, where one "CMD" cycle indicates a main command sent from the flash I/F 137, five "Addr" cycles indicate a physical address of the LUNs 150 to be read sent from the flash I/F 137, one "CMD" cycle indicates a confirm command sent from the flash I/F 137, and "$D_{OUT}$" cycles indicate data corresponding to the physical address, which is sent from the LUN 150. A waveform 520 shows an exemplary snap read command based on the waveform 510, in which the main command is 00h and the confirm command is 20h. Thus, the LUNs 150 determine that this access command is a snap read command requesting to read partial page data of the designated page (indicated by the physical address).

Figure 6:
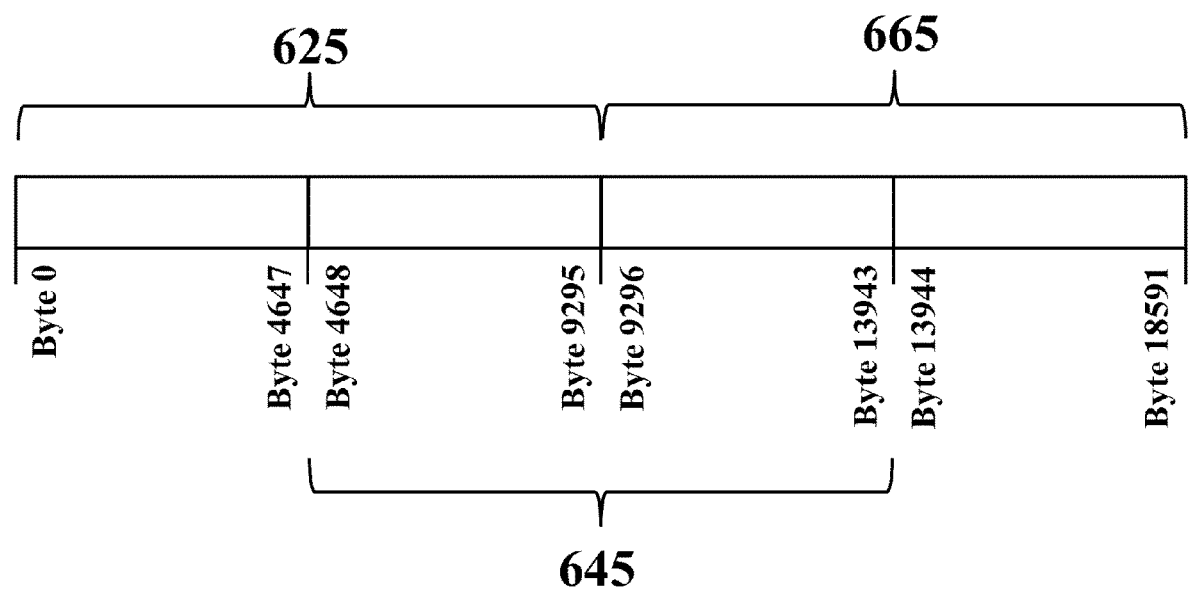
FIG. 6 is a schematic diagram showing different section types of one page.

Partial page data, for example, 8 KB data of a 16 KB-page, referring to FIG. 6, may be selected from one page according to any of three different types: the first 8 KB section 625; the middle 8 KB section 645; and the last 8 KB section 665. The length of each 8 KB section is preferably longer than or equal to 8 KB. Moreover, the partial page data may be, for example, 4 KB data of a 16 KB-page, that is, the 16 KB-page is separated into the first 4 KB section, the second 4 KB section, the third 4 KB section and the fourth 4 KB section. The length of each 4 KB section is preferably longer than or equal to 4 KB.

Figure 8:
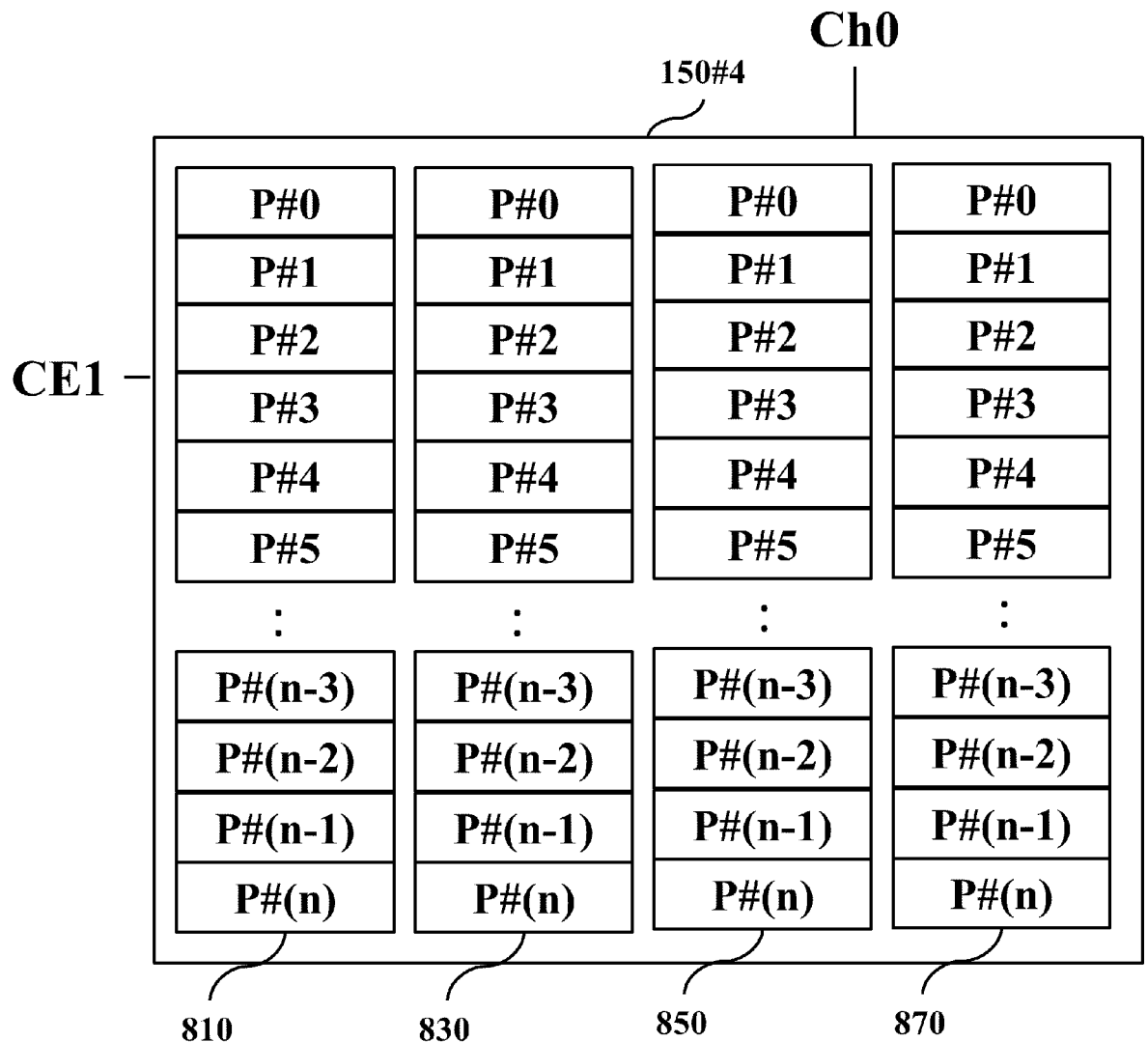
FIG. 8 is a schematic diagram showing the data organization of planes and pages across planes of a LUN.

Moreover, since each LUN 150 includes multiple planes, the controller 130 may output a multi-page read lite (MPR-Lite) command for reading partial data of a page on multiple planes, for example, with references made to FIGS. 6 and 8, the first 8 KB section 625 of the page P#0 on the planes 810 and 830 and the last 8 KB section 665 of the page P#1 on the planes 830 and 850. The MPR-Lite command can improve the read performance of partial data.

Refer to FIG. 1. Taking data reads as an example, the processor core 133-0 may obtain a data read command from the host 110 through the host I/F 131, in which provides a logical address of target data. The processor core 133-0 searches the logical address appeared in the L2P table to obtain the page location (physical address) of the target data stored in a LUN 150 and searches the physical address appeared in the physical configuration table to know the programming mode of the target data. Subsequently, the processor core 133-0 generates and stores the flash-memory access command in the command queue 135, in which includes the physical address of the target data.

Figure 9:
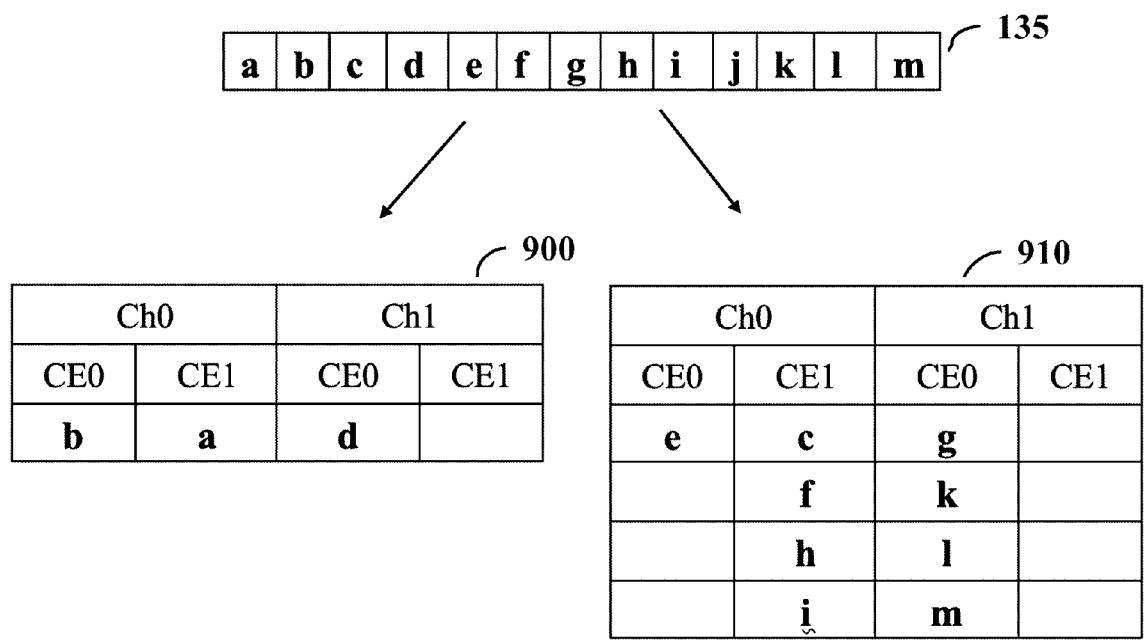
FIG. 9 is a schematic diagram showing a scheduling of flash-memory access commands in some implementations.

The controller 130 may utilize the command queue 135 to store multiple (for example, 64) flash-memory access commands. The processor core 133-1 may create and maintain a scheduling table 900 and/or a standby table 910 to sort the flash-memory access commands of the command queue 135, thereby enabling the flash-memory access commands to be executed more efficient. Refer to FIG. 9. For example, the command queue 135 stores thirteen read page commands labeling from "a" to "m". The processor core 133-1 records the read page commands for reading a designated LUN 150 in designated columns of the scheduling table 900. For example, the read page commands "b", "a" and "d" are put into the scheduling table 900 for reading pages of the LUNs 150#0, 150#4 and 150#1, respectively. The processor core 133-1 may simultaneously output the read page commands "b", "a" and "d" to the LUNs 150#0, 150#4 and 150#1 in the interleaving manner. The processor core 133-1 puts the read page commands "c" and "e" to "m" into the standby table 910. After the read page commands "b", "a" and "d" are executed completely, the read page commands "e", and "g" are put into the scheduling table 900. Then, the read page commands "j", "f" and "k" are put into the scheduling table 900. Lastly, the read page commands and are put into the scheduling table 900. Thus, the thirteen read page commands are executed completely in four cycles. In some implementations, the processor core 133-1 only creates and maintains the scheduling table 900 and puts the flash-memory access commands into the scheduling table 900 in sequence. After executing the flash-memory access commands of the first row completely, the processor core 133-1 continues to execute the flash-memory access commands of the second row. The executions of remaining flash-memory access commands can be deduced by analogy and are omitted herein for brevity.

Figure 7:
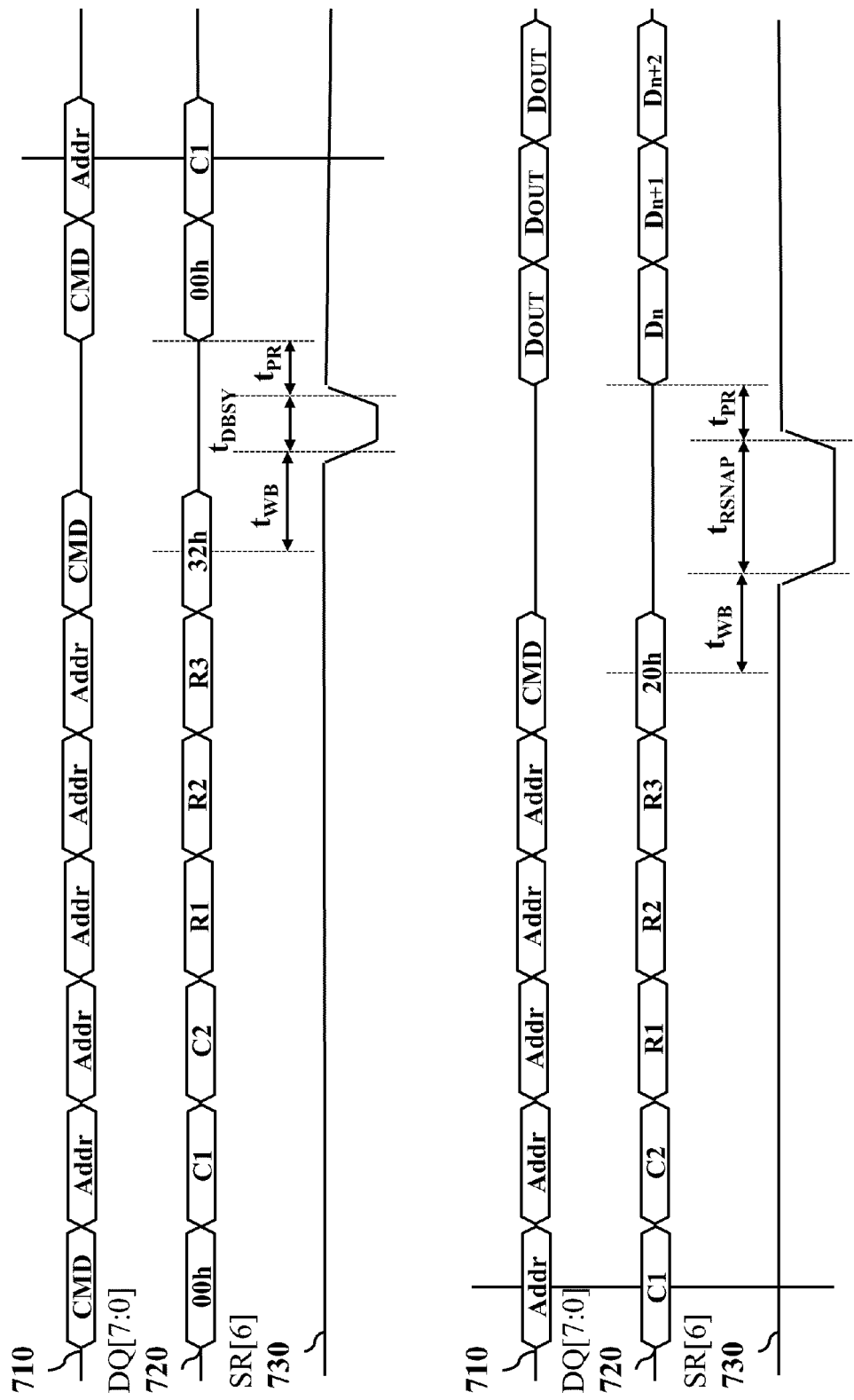
FIG. 7 is a timing diagram illustrating a multi-page read lite (MPR-Lite) command on a flash interface.
Figure 11:
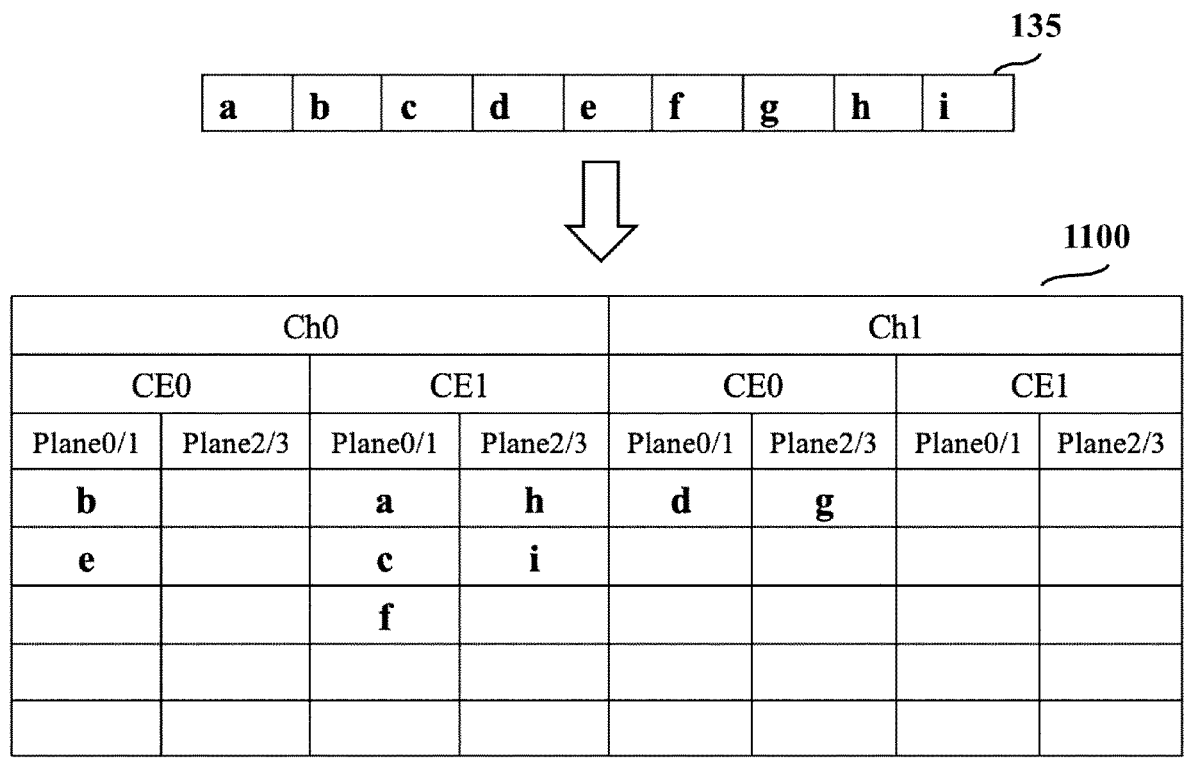
FIGS. 11 and 12 are schematic diagrams illustrating a scheduling of flash-memory access commands according to an embodiment of the invention.

If the target data is 4 KB or 8 KB data of one page, then the controller 130 may store a snap read command rather than a read page command in the command queue 135. Or, the controller 130 may execute the MPR-Lite command as a substitute of the snap read commands. That is, several snap read commands are integrated into one MPR-Lite command, so as to form a MPR-Lite operation. Refer to FIG. 7. For the integration of several snap read commands into one MPR-Lite command, the controller 130 replaces several snap read commands with read page multi-plane commands, in which the confirm command is 32h as shown in the lower part of FIG. 7, and maintains the last snap read command, in which the confirm command is 20h as shown in the lower part of FIG. 7. Note that a data-ready time $t_{RSNAP}$ required by the read page multi-plane command is shorter than a data-ready time $t_{DBSY}$ required by the snap read command. Thus, the controller 130 can not only employ simultaneous and interleaving operations to execute the snap read commands, but also enhance the execution efficiency of the snap read commands. Refer to FIG. 11. The snap read command "b" being executed reads target data of the LUN 150#0, the snap read command "a" and "h" being executed reads target data across different planes of the LUN 150#4 and the snap read command "d" and "g" being executed reads target data across different planes of the LUN 150#1. Thus, the controller 130 may execute an MPR-Lite command to substitute for the snap read commands "a", "b", "h" and That is, the controller 130 may execute five snap read commands at one time, greater than three snap read commands in conventional ways. In other words, the MPR-Lite command improves the execution efficiency of snap read commands by 66%.

Figure 10:
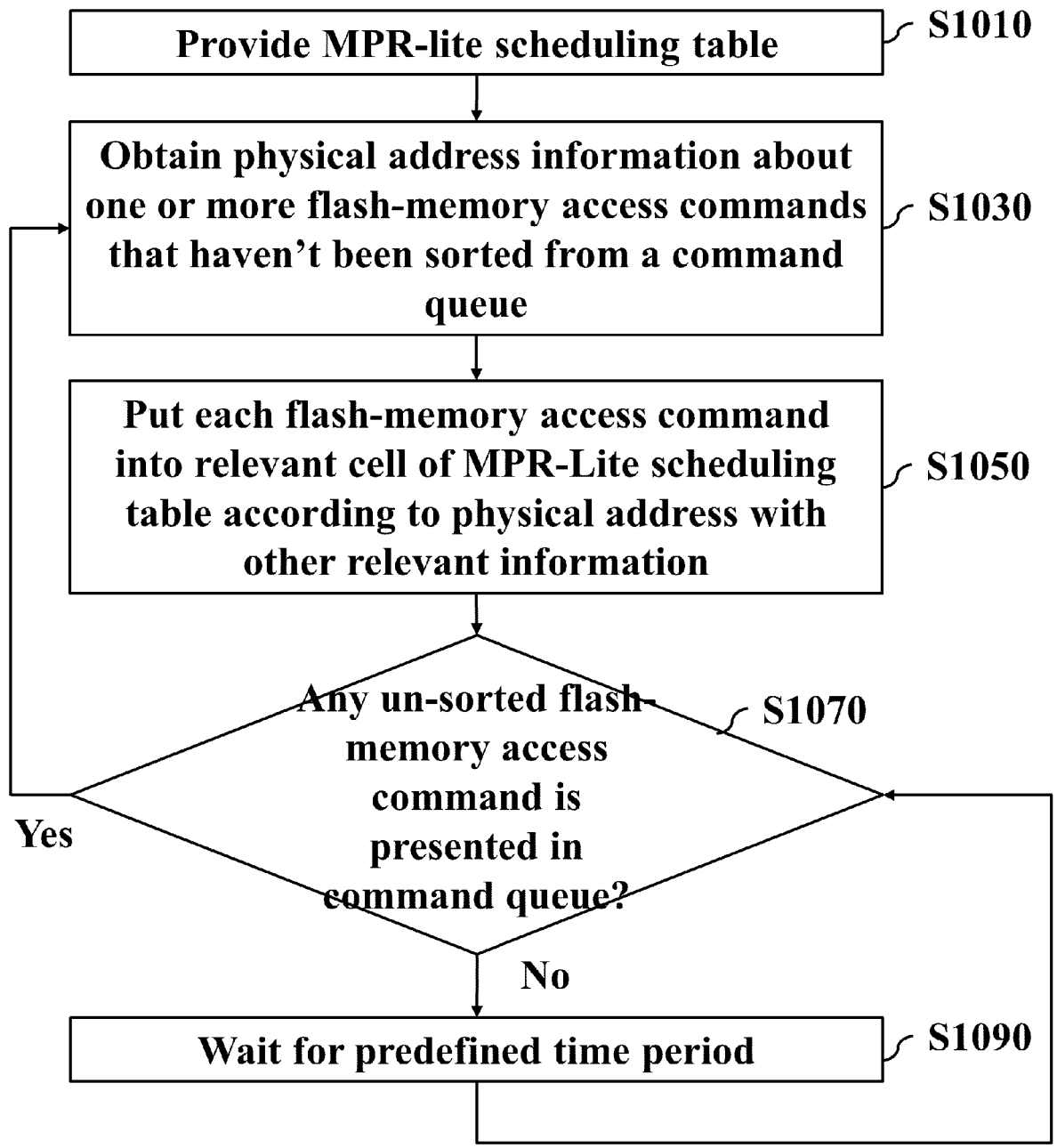
FIG. 10 is a flowchart illustrating a method for scheduling flash-memory access commands according to an embodiment of the invention.

In some embodiments, to respond to the aforementioned MPR-Lite command, the processor core 133-1 when loading and executing relevant software or firmware instructions practices the method for sorting the flash-memory access commands as shown in FIG. 10.

Step S1010: The processor core 133-1 provides an MPR-Lite scheduling table in the data cache 136. Comparing to the scheduling table 900 and the standby table 910 as shown in FIG. 9, the MPR-Lite scheduling table provides finer classification for each LUN to facilitate an integration of two snap read commands or more into one MPR-Lite operation.

Refer to FIG. 11. The MRP-Lite scheduling table 1100, for each LUN, contains two columns "Plane0/1" and "Plan2/3" and each snap read command is stored into a cell of one column according to the physical address that is attempted to read. For example, cells of the third column of the MPR-Lite scheduling table 110 are used to record the snap read commands for reading data on the plane 810 and/or the plane 830 and cells of the fourth column of the MPR-Lite scheduling table 110 are used to record the snap read commands for reading data on the plane 850 and/or the plane 870.

Figure 12:
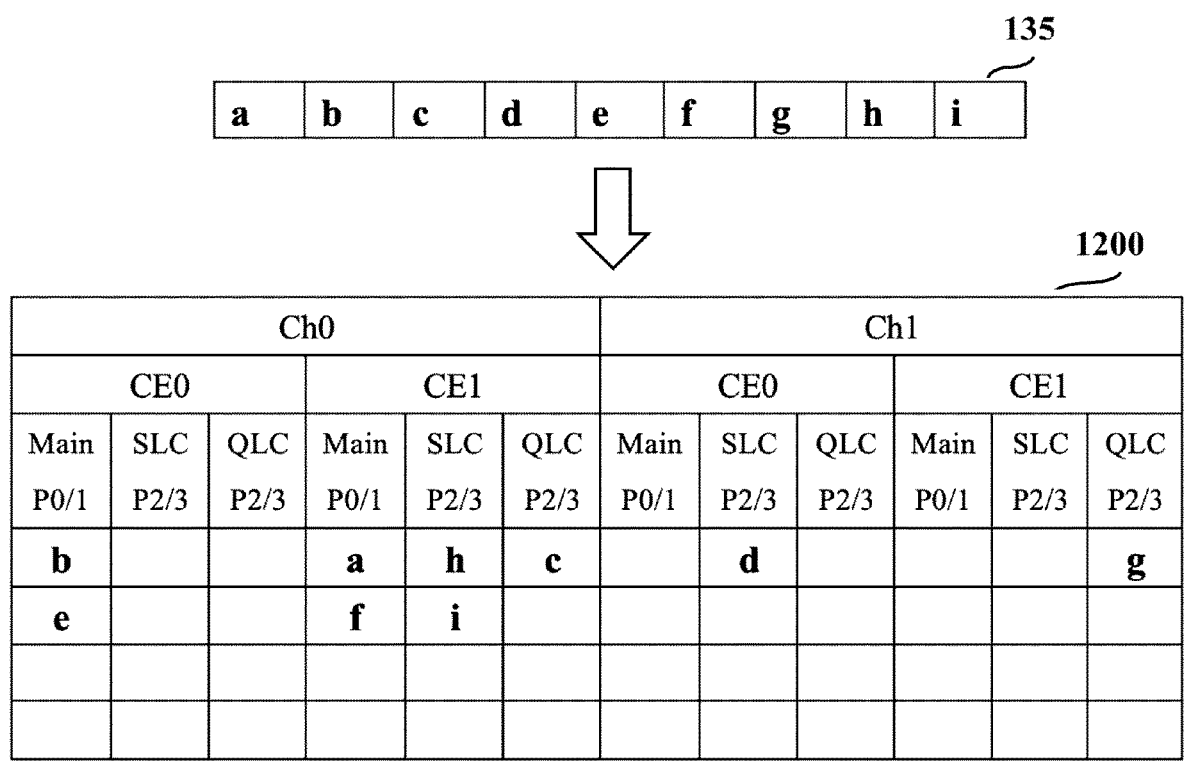

Moreover, a data programming into a block may employ a default programming mode, such as the TLC or QLC mode, or the SLC mode. Data being programmed in a programming mode can be correctly read out when the right data read operation is used. In the integration of the snap read commands into one MPR-Lite command, for the accuracy of data reads, the integrated snap read commands have to read target data that has been programmed in the same programming mode. Therefore, the MPR-Lite scheduling table 1100 may be slightly modified to become the MPR-Lite scheduling table 1200 as shown in FIG. 12. For each LUN, the MPR-Lite scheduling table 1200 may contain three columns "Main P0/1", "SLC P2/3" and "QLC P2/3" and each snap read command is stored into a cell of one column according to the physical address that is attempted to read in a specific mode. For example, cells of the fourth column thereof are used to record flash-memory access commands for reading data on the plane 810 and/or the plane 830 in regardless mode, cells of the fifth column thereof are used to record flash-memory access commands for reading data on the plane 850 and/or the plane 870 in the SLC mode, and cells of the sixth column thereof are used to record flash-memory access commands for reading data on the plane 850 and/or the plane 870 in the QLC mode.

Next, refer to FIG. 10. The processor core 133-1 repeatedly executes a loop (steps S1030 to S1090) for arranging each flash-memory access command into a proper cell of the MPR-Lite scheduling table. Details in each iteration are described as follows:

Step S1030: The processor core 133-1 obtains physical address information about one or more flash-memory access commands that haven't been sorted from the command queue 135.

Step S1050: The processor core 133-1 puts each flash-memory access command into a relevant cell of the MPR-Lite scheduling table according a physical address with other relevant information. If a flash-memory access command advises the processor core 133-1 to read data on the planes 830 and 850, then the processor core 133-1 puts the flash-memory access command into a cell of a column associated with the plane 830, for example, the column "Plane0/1" of FIG. 11 or the column "Main P0/1" of FIG. 12. Refer to the use cases as shown in FIG. 11. Cells of the third column of the MPR-Lite scheduling table 1100 are used to record snap read commands "a", "c" and "f" for reading data on the plane 810 and/or the plane 830. Cells of the fourth column thereof are used to record snap read commands "h" and "i" for reading data on the plane 850 and/or the plane 870.

In alternative embodiments of step S1050, other relevant information related to a flash-memory access command includes which mode is used to read data for this flash-memory access command. The processor core 133-1 may search the content of the physical configuration table of the data cache 136 and knows which mode is used for this flash-memory access command according to the programming mode of the block that the physical address maps to. Refer to the use cases as shown in FIG. 12. Cells of the fourth column of the MPR-Lite scheduling table 1200 are used to record snap read commands "a" and "f" for reading data on the plane 810 and/or the plane 830. Cells of the fifth column thereof are used to record snap read commands and "h" and "i" for reading data on the plane 850 and/or the plane 870 in the SLC mode. Cells of the sixth column thereof are used to record snap read command "c" for reading data on the plane 850 and/or the plane 870 in the QLC mode.

Figure 13:
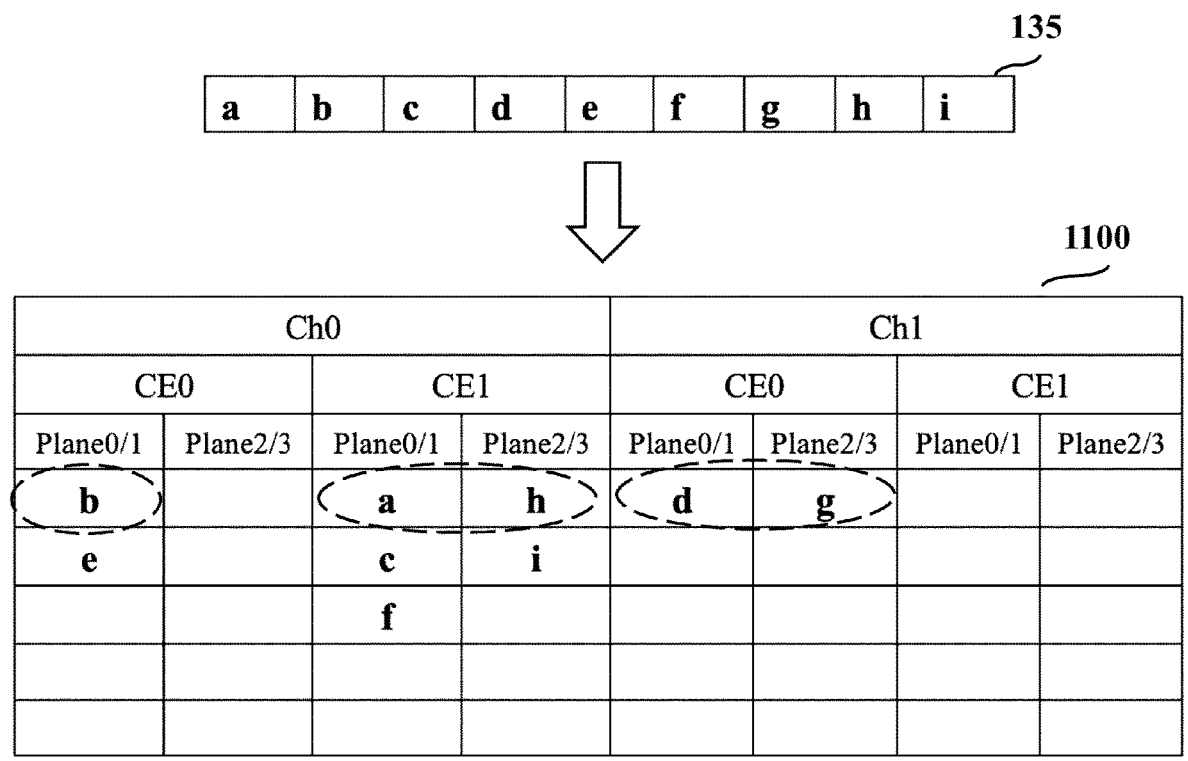
FIGS. 13 and 14 are schematic diagrams illustrating selections of flash-memory access commands according to an embodiment of the invention.

Subsequent to the sorting as shown in FIG. 11, FIG. 13 shows use cases for selecting flash-memory access commands to execute. For example, in a batch, the processor core 133-1 drives the flash I/F 137 to issue a read page command to the LUN 150#0 for reading data of a physical address that the snap read command "b" indicates; and, issue a read page multi-plane command to the LUN 150#4 for reading data of physical addresses that the snap read commands "a" and "h" indicates, issue a read page multi-plane command to the LUN 150#1 for reading data of a physical address that the snap read command "d" indicates, and issue a snap read command to the LUN 150#1 for reading data of a physical address that the snap read command "g" indicates, so as to form a MPR-lite operation. Note that each snap read command originally requests for reading data whose length is shorter than a length of one page across planes.

Figure 14:
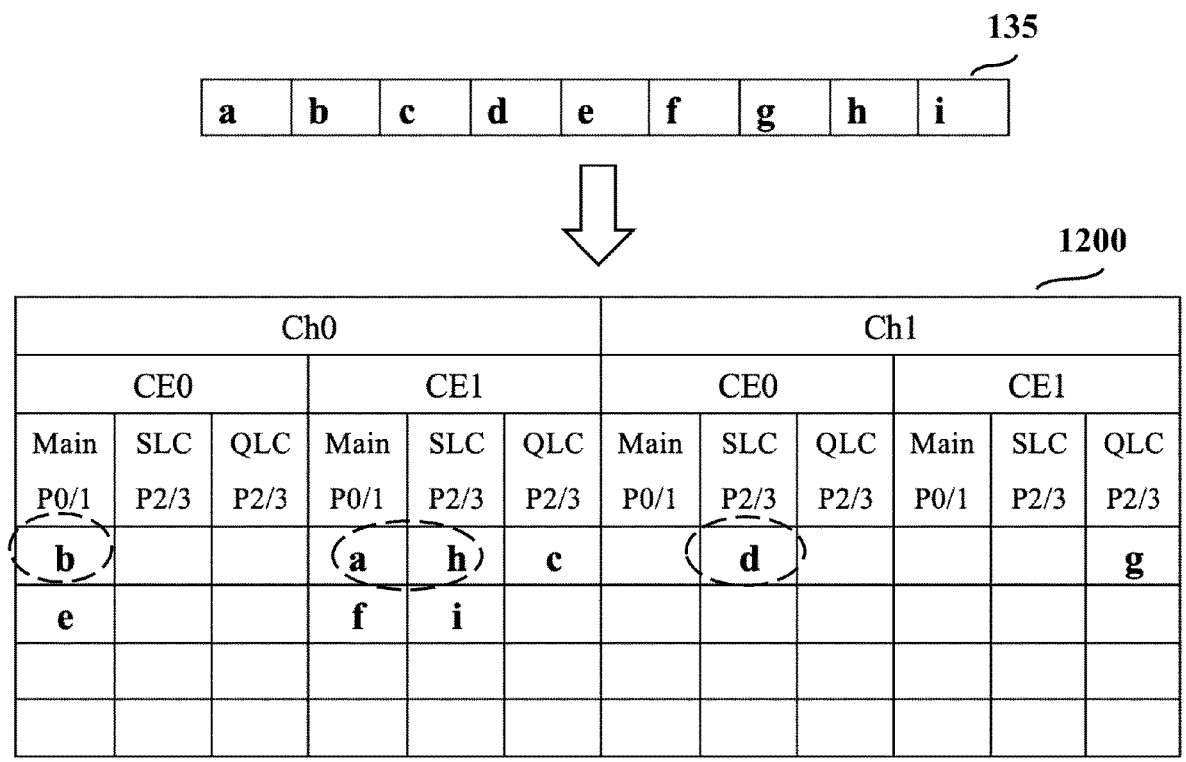

Subsequent to the sorting as shown in FIG. 12, FIG. 14 shows use cases for selecting flash-memory access commands to execute. For example, in a batch, the processor core 133-1 determines that the target data is programmed in the SLC mode, therefore drives the flash I/F 137 to issue a read page multi-plane command to the LUN 150#0 for reading data of a physical address that the snap read command "b" indicates, issue a read page multi-plane command to the LUN 150#4 for reading data of physical addresses that the snap read commands "a" and "h" indicate, and issue a snap read command to the LUN 150#1 for reading data of physical address that the snap read command indicates, so as to form a MPR-Lite operation. Note that each snap read command originally requests for reading data whose length is shorter than a length of one page across planes.

With references made to the sorting of the MPR-Lite scheduling table, the processor core 133-1 may issue aforementioned snap read commands batch-by-batch. But, when the processor core 133-1 changes to issue a MPR-Lite command to read partial data of pages on multiple planes, it not only improves the efficiency of data reads, but also improves the efficiency of fragment read operation. In a 4K random read Q64/T4 test, comparing to the issuance of snap read commands, the issuance of MPR-Lite commands may increase the average of data-read hit rates by 30%~50%. A data-read hit rate defines a percentage that data read from the LUNs 150 through the flash I/F 137 is kept to reply to the host 110. For example, when the whole 8K data read by a snap read command is kept to reply to the host 110, the data-read hit rate is 100%. When the half of 8K data read by a snap read command is kept to reply to the host 110, the data-read hit rate is 50%.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIG. 1, it should be noted that additional elements may be included to achieve better performance without departing from the spirit of the invention. Each element of FIG. 1 is composed of various circuits and arranged to operably perform the aforementioned operations. While the process flows described in FIG. 10 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer-readable storage medium for reading partial data of a page on multiple data planes when executed by a processor core, the non-transitory computer-readable storage medium comprising program code to:
provide a scheduling table;
put each flash-memory access command of a command queue into a cell of the scheduling table according to physical address information of the flash-memory access command;
select two or more flash-memory access commands for a logical unit number (LUN) from the scheduling table, wherein each of the selected flash-memory access commands requests for reading data whose length is shorter than a length of one page across data planes;
drive a flash interface to perform a multi-page read lite (MPR-Lite) operation for reading data requested by the selected flash-memory access commands from the LUN; and
reply with the read data requested by the selected flash-memory access commands to a host.

2. The non-transitory computer-readable storage medium of claim 1, wherein the MPR-Lite operation comprises:
driving the flash interface to issue a snap read command following issuance of one or more read page multi-plane commands to the LUN, so as to read data of physical addresses that the selected flash-memory access commands indicate.

3. The non-transitory computer-readable storage medium of claim 2, wherein the read page multi-plane command or the read data multi-plane commands, and the snap read command are used to read partial data of different pages across data planes, respectively.

4. The non-transitory computer-readable storage medium of claim 2, wherein the read page multi-plane command or the read data multi-plane commands, and the snap read command are executed in a programming mode.

5. The non-transitory computer-readable storage medium of claim 4, wherein the programming mode is a Single-Level Cell (SLC) mode, a Triple-Level Cell (TLC) mode or a Quad-Level Cell (QLC) mode.

6. The non-transitory computer-readable storage medium of claim 1, wherein the flash memory access commands are snap read commands, and the non-transitory computer program product comprising program code to:
integrate the selected flash-memory access commands into one MPR-Lite command, so as to form the MPR-Lite operation.

7. The non-transitory computer-readable storage medium of claim 6, wherein the integration for the MPR-Lite command comprises replacing the selected snap read commands except for the last selected snap read command with read page multi-plane commands.

8. A method for reading partial data of a page on multiple data planes, performed by a processor core, comprising:
providing a scheduling table;
putting each flash-memory access command of a command queue into a cell of the scheduling table according to physical address information of the flash-memory access command;
selecting two or more flash-memory access commands for a logical unit number (LUN) from the scheduling table, wherein each of the selected flash-memory access commands requests for reading data whose length is shorter than a length of one page across data planes;
driving a flash interface to perform a multi-page read lite (MPR-Lite) operation for reading data requested by the selected flash-memory access commands from the LUN; and
replying with the read data requested by the selected flash-memory access commands to a host.

9. The method of claim 8, wherein the MPR-Lite operation comprises:
driving the flash interface to issue a snap read command following issuance of one or more read page multi-plane commands to the LUN, so as to read data of physical addresses that the selected flash-memory access commands indicate.

10. The method of claim 9, wherein data-ready time required by each read page multi-plane command is shorter than data-ready time required by the snap read command.

11. The method of claim 9, wherein each column of the scheduling table is used to record information about flash-memory access commands for reading data on a specific data plane of a designated LUN.

12. The method of claim 9, wherein each column of the scheduling table is used to record information about flash-memory access commands for reading data on a first data plane of a designated LUN, on a second data plane of the designated LUN in a first programming mode, or on the second data plane of the designated LUN in a second programming mode.

13. An apparatus for reading partial data of a page on multiple data planes, comprising:

a memory arranged to operably store a scheduling table; and a processor core, coupled to the memory, arranged to operably put each flash-memory access command of a command queue into a cell of the scheduling table according to physical address information of the flash-memory access command; select two or more flash-memory access commands for a logical unit number (LUN) from the scheduling table, wherein each of the selected flash-memory access commands requests for reading data whose length is shorter than a length of one page across data planes; and drive a flash interface to perform a multi-page read lite (MPR-Lite) operation for reading data requested by the selected flash-memory access commands from the LUN, so as to reply with the read data requested by the selected flash-memory access commands to a host.

14. The apparatus of claim 13, wherein the processor core, in the MPR-Lite operation, is arranged to operably drive the flash interface to issue a snap read command following issuance of one or more read page multi-plane commands to the LUN, so as to read data of physical addresses that the selected flash-memory access commands indicate.

15. The apparatus of claim 14, wherein the read page multi-plane command or the read data multi-plane commands, and the snap read command are used to read partial data of different pages across data planes, respectively.

16. The apparatus of claim 14, wherein the read page multi-plane command or the read data multi-plane commands, and the snap read command are executed in a programming mode.

17. The apparatus of claim 16, wherein the programming mode is a Single-Level Cell (SLC) mode, a Triple-Level Cell (TLC) mode or a Quad-Level Cell (QLC) mode.

18. The apparatus of claim 13, wherein the flash memory access commands are snap read commands, and the processor core is arranged to operably replace the selected snap read commands except for the last selected snap read command with read page multi-plane commands.

19. The apparatus of claim 13, wherein each column of the scheduling table is used to record information about flash-memory access commands for reading data on a specific data plane of a designated LUN.

20. The apparatus of claim 13, wherein each column of the scheduling table is used to record information about flash-memory access commands for reading data on a first data plane of a designated LUN, on a second data plane of the designated LUN in a first programming mode, or on the second data plane of the designated LUN in a second programming mode.

* * * * *